US012137254B2

United States Patent
Iwamura et al.

(10) Patent No.: US 12,137,254 B2
(45) Date of Patent: *Nov. 5, 2024

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,525

(22) Filed: Mar. 29, 2023

(65) Prior Publication Data

US 2023/0239514 A1 Jul. 27, 2023

Related U.S. Application Data

(63) Continuation of application No. 17/560,890, filed on Dec. 23, 2021, now Pat. No. 11,647,233, which is a
(Continued)

(30) Foreign Application Priority Data

Jun. 25, 2019 (JP) .................................. 2019-117924

(51) Int. Cl.
*H04N 11/02* (2006.01)
*H04N 19/117* (2014.01)
(Continued)

(52) U.S. Cl.
CPC ........... *H04N 19/86* (2014.11); *H04N 19/117* (2014.11); *H04N 19/124* (2014.11);
(Continued)

(58) Field of Classification Search
CPC .... H04N 19/86; H04N 19/117; H04N 19/124; H04N 19/132; H04N 19/176; H04N 19/18; H04N 19/61; H04N 19/91
(Continued)

(56) References Cited

U.S. PATENT DOCUMENTS

| 11,647,233 B2* | 5/2023 | Iwamura | H04N 19/176 |
| | | | 375/240.03 |
| 2014/0003495 A1* | 1/2014 | Chuang | H04N 19/119 |
| | | | 375/240.02 |

(Continued)

FOREIGN PATENT DOCUMENTS

| KR | 10-2016-0068288 A | 6/2016 |
| WO | 2014/002897 A1 | 1/2014 |

(Continued)

OTHER PUBLICATIONS

International Search Report issued in PCT/JP2020/024676; mailed Sep. 29, 2020.

(Continued)

*Primary Examiner* — Jayanti K Patel
*Assistant Examiner* — Richard B Carter
(74) *Attorney, Agent, or Firm* — Studebaker & Brackett PC

(57) ABSTRACT

An encoding device comprises: a transformer/quantizer configured to perform a transform process and a quantization process on a residual signal that represents a difference between an encoding-target block and a prediction block obtained by predicting the encoding-target block; an inverse quantizer/inverse transformer configured to restore the residual signal by performing an inverse quantization process and an inverse transform process on transform coefficients obtained by the transformer/quantizer; a combiner configured to reconstruct the encoding-target block by com-
(Continued)

bining the restored residual signal and the prediction block; a deblocking filter configured to perform a filter process on a boundary between two blocks including the reconstructed block and a block adjacent to the reconstructed block; and a filter controller configured to control the deblocking filter, based on a type of the transform process applied with respect to the two blocks.

4 Claims, 5 Drawing Sheets

Related U.S. Application Data continuation of application No. PCT/JP2020/024676, filed on Jun. 23, 2020.

(51) Int. Cl.
| | | |
|---|---|---|
| *H04N 19/124* | (2014.01) | |
| *H04N 19/132* | (2014.01) | |
| *H04N 19/176* | (2014.01) | |
| *H04N 19/18* | (2014.01) | |
| *H04N 19/61* | (2014.01) | |
| *H04N 19/86* | (2014.01) | |
| *H04N 19/91* | (2014.01) | |

(52) U.S. Cl.
CPC ......... *H04N 19/132* (2014.11); *H04N 19/176* (2014.11); *H04N 19/18* (2014.11); *H04N 19/61* (2014.11); *H04N 19/91* (2014.11)

(58) Field of Classification Search
USPC ........................................ 375/240.03, 240.02
See application file for complete search history.

(56) References Cited

U.S. PATENT DOCUMENTS

| | | | |
|---|---|---|---|
| 2014/0072033 A1* | 3/2014 | Chuang ................. | H04N 19/82 375/240.02 |
| 2015/0139304 A1 | 5/2015 | Sato et al. | |
| 2017/0064313 A1* | 3/2017 | Wu ........................ | H04N 19/70 |
| 2017/0127090 A1 | 5/2017 | Rosewarne et al. | |
| 2018/0146197 A1* | 5/2018 | Yi ......................... | H04N 19/124 |
| 2019/0313095 A1 | 10/2019 | Ikeda | |

FOREIGN PATENT DOCUMENTS

| | | |
|---|---|---|
| WO | 2018/123444 A1 | 7/2018 |
| WO | 2020/239038 A1 | 12/2020 |

OTHER PUBLICATIONS

Series H: Audiovisual and Multimedia Systems Infrastructure of audiovisual services—Coding of moving video, Recommendation ITU-T H.265, "High efficiency video coding", Dec. 2016, pp. 1-664, International Telecommunication Union.
Benjamin Bross et al. "Versatile Video Coding (Draft 5)" Joint Video Experts Team (JVET) of ITU-T SG 16 WP 3 and ISO/IEC JTC 1/SC 29/WG 11, Document: JVET-N1001-v7, 14th Meeting: Geneva, CH, Mar. 19-27, 2019, pp. 1-4.
Shunsuke Iwamura et al. "Non-CES: Boundary strength derivation of deblocking filter for transform-skipped block", Joint Video Experts Team (JVET) of ITU-T SG 16 WP 3 and ISO/IEC JTC 1/SC 29/WG 11, Document: JVET-O0656, 15th Meeting: Gothenburg, SE, Jul. 3-12, 2019, pp. 1-11.
"Notice of Reasons for Refusal" Office Action issued in JP 2022-076156; mailed by the Japanese Patent Office on May 24, 2022.
"Decision for Grant of Patent" Office Action issued in JP 2022-076156; mailed by the Japanese Patent Office on Jul. 26, 2022.

* cited by examiner

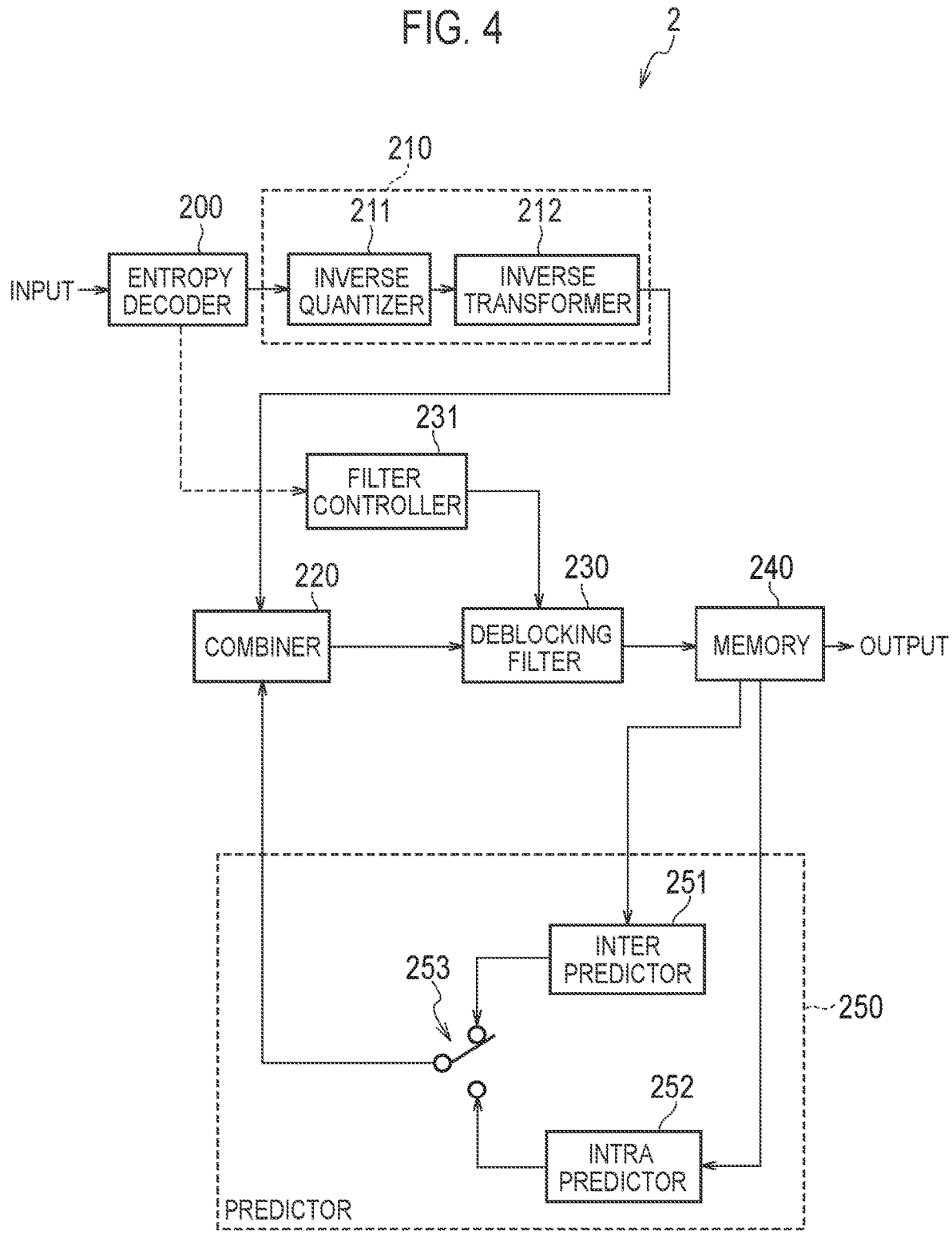

ENCODING DEVICE, DECODING DEVICE AND PROGRAM

CROSS-REFERENCE TO RELATED APPLICATIONS

This application is a Continuation of U.S. patent application Ser. No. 17/560,890 filed Dec. 23, 2021, which is a continuation based on PCT Application No. PCT/JP2020/024676, filed on Jun. 23, 2020, which claims the benefit of Japanese Patent Application No. 2019-117924 filed on Jun. 25, 2019. The content of which is incorporated by reference herein in their entirety.

TECHNICAL FIELD

The present disclosure relates to an encoding device, a decoding device and a program.

BACKGROUND ART

In HEVC (High Efficiency Video Coding), and VVC (Versatile Video Coding), which is a next-generation encoding scheme, a deblocking filter is adopted as an encoding in-loop filter, to restrain distortion at a block boundary portion when an encoding process is performed on a block basis (for example, see Non Patent Literature 1).

When intra prediction is applied to at least one of two blocks including an encoding-target block and a neighboring block, a filter controller, which controls the deblocking filter, applies the deblocking filter to the boundary between the two blocks.

When inter prediction is applied to each of the two blocks, and when a difference between motion vectors applied to the two blocks is equal to or larger than a predetermined threshold value, the filter controller performs control such as to apply the deblocking filter to the boundary between the two blocks. This is because discontinuity is likely to occur at a block boundary when motion vectors are different.

When a non-zero coefficient exists in at least one of the two blocks, the filter controller performs control such as to apply the deblocking filter to the boundary between the two blocks even if the difference between the motion vectors is smaller than the threshold value. This is because, since energy of a residual signal is distributed all over the block as a result of inverse transform of the non-zero coefficient, discontinuity is likely to occur at the boundary between the two blocks even if the motion vectors are identical.

Moreover, in HEVC and VVC, transform skip is introduced in which no transform is applied to a residual signal. In transform skip, the residual signal is scaled to obtain scaled transform coefficients, without applying a transform such as DCT (Discrete Cosine Transform) or DST (Discrete Sine Transform). Accordingly, an increase in entropy can be restrained by selecting transform skip for a residual signal including a sharp edge or a residual signal having high energy only in a local area.

CITATION LIST

Non Patent Literature

Non Patent Literature 1: Recommendation ITU-T H.265, (12/2016), "High efficiency video coding", International Telecommunication Union

DISCLOSURE OF INVENTION

An encoding device according to a first feature encodes a block obtained by dividing an image, the encoding device comprises: a transformer/quantizer configured to perform a transform process and a quantization process on a residual signal that represents a difference between the block and a prediction block obtained by predicting the block; an inverse quantizer/inverse transformer configured to restore the residual signal by performing an inverse quantization process and an inverse transform process on transform coefficients obtained by the transformer/quantizer; a combiner configured to reconstruct the block by combining the restored residual signal and the prediction block; a deblocking filter configured to perform a filter process on a boundary between two blocks including the reconstructed block and a block adjacent to the reconstructed block; and a filter controller configured to control the deblocking filter, based on a type of the transform process applied with respect to the two blocks.

A decoding device according to a second feature decodes a block obtained by dividing an image, the decoding device comprises: an entropy decoder configured to output quantized transform coefficients corresponding to the block by decoding an encoded stream; an inverse quantizer/inverse transformer configured to restore a residual signal by performing an inverse quantization process and an inverse transform process on the transform coefficients outputted by the entropy decoder; a combiner configured to reconstruct the block by combining the restored residual signal and a prediction block obtained by predicting the block; a deblocking filter configured to perform a filter process on a boundary between two blocks including the reconstructed block and a block adjacent to the reconstructed block; and a filter controller configured to control the deblocking filter, based on a type of the inverse transform process applied with respect to the two blocks.

A program according to a third feature causes a computer to function as the encoding device according to the first feature.

A program according to a fourth feature causes a computer to function as the decoding device according to the second feature.

BRIEF DESCRIPTION OF DRAWINGS

FIG. 4s is a diagram illustrating the configuration of a decoding device according to the embodiment.

DESCRIPTION OF EMBODIMENTS

Even if a non-zero coefficient exists in at least one of two blocks, the non-zero coefficient is outputted as it is after subjected to adjustment such as scaling when transform skip is applied to the block in which the non-zero coefficient exists. Accordingly, energy is not distributed all over the block, so that discontinuity between the blocks does not occur.

In conventional deblocking filter control, a deblocking filter is not controlled with transform types, including transform skip, taken into consideration. Accordingly, the deblocking filter can be applied even when discontinuity between blocks does not occur as described above. Consequently, a blur may appear in a decoded image, so that image quality may be degraded, and encoding efficiency may be lowered.

Accordingly, an object of the present disclosure is to enhance image quality and encoding efficiency by appropriately controlling the deblocking filter.

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

<Configuration of Encoding Device>

Figure 1:
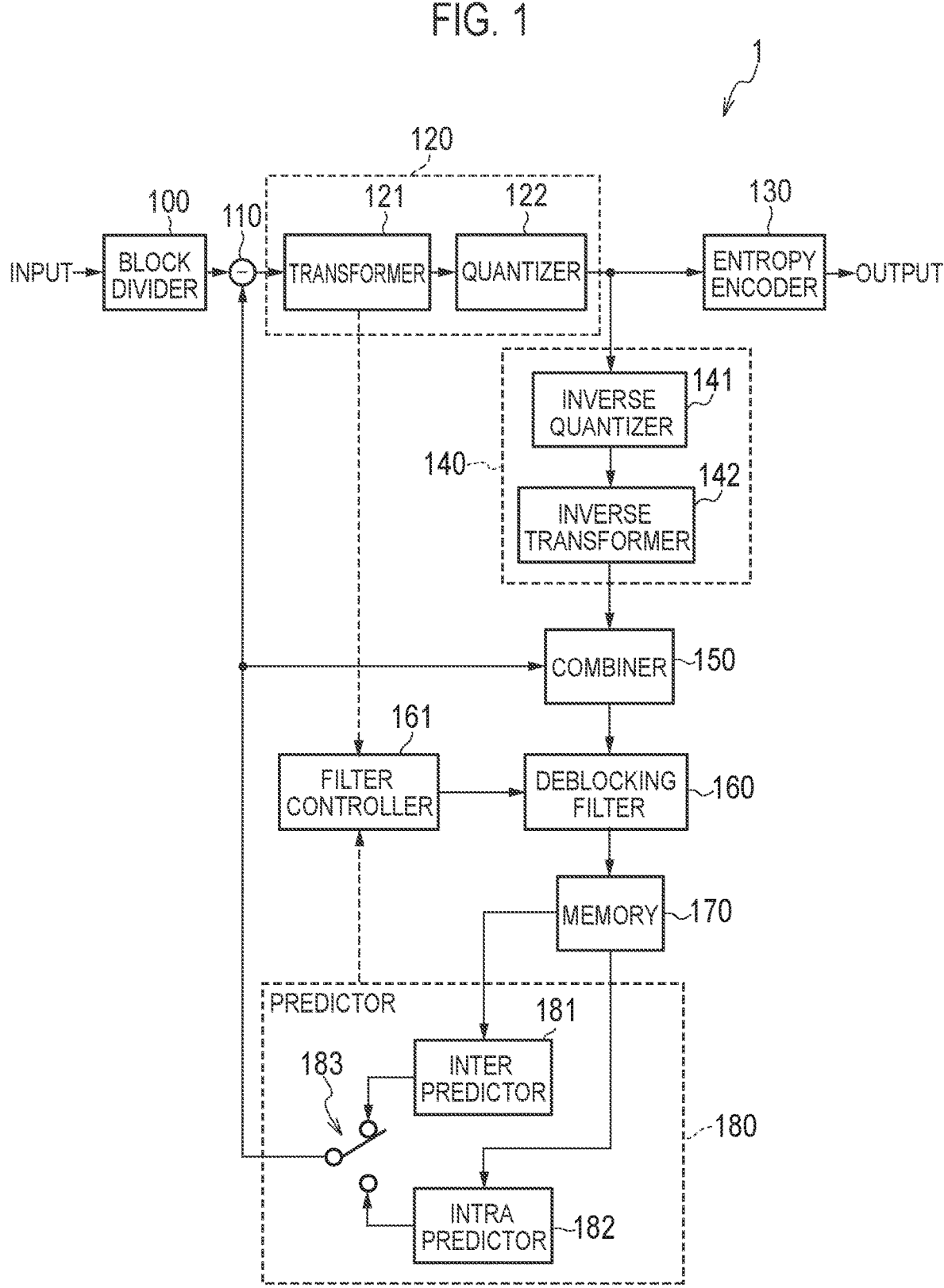
FIG. 1 is a diagram illustrating the configuration of an encoding device according to an embodiment.

First, a configuration of the encoding device according to the present embodiment is described. FIG. 1 is a diagram illustrating the configuration of the encoding device 1 according to the present embodiment. The encoding device 1 is a device that encodes an encoding-target block obtained by dividing an image.

As illustrated in FIG. 1, the encoding device 1 includes a block divider 100, a subtractor 110, a transformer/quantizer 120, an entropy encoder 130, an inverse quantizer/inverse transformer 140, a combiner 150, a deblocking filter 160, a filter controller 161, a memory 170, and a predictor 180.

The block divider 100 divides an input image given in the form of a frame (or a picture) that constitutes a part of a video into a plurality of image blocks and outputs the resulting image blocks to the subtractor 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The block divider 100 performs block division on a luminance signal and a chrominance signal. Although a following description is given mainly of a case in which shapes made by the block division are identical for the luminance signal and the chrominance signal, the division may be controllable independently for the luminance signal and the chrominance signal. A luminance block and a chrominance block are simply referred to as an encoding-target block when the blocks are not particularly distinguished from each other.

The subtractor 110 calculates prediction residuals that represent differences (errors) between an encoding-target block outputted from the block divider 100 and a prediction block obtained by the predictor 180 predicting the encoding-target block. The subtractor 110 calculates a prediction residual by subtracting each pixel value in the prediction block from each pixel value in the block, and outputs the calculated prediction residuals to the transformer/quantizer 120. Hereinafter, a signal including the prediction residuals in units of block is referred to as a residual signal.

The transformer/quantizer 120 executes a transform process and a quantization process on each of blocks. The transformer/quantizer 120 includes a transformer 121 and a quantizer 122.

The transformer 121 calculates transform coefficients for each frequency component by performing the transform process on the residual signal outputted from the subtractor 110, and outputs the calculated transform coefficients to the quantizer 122. The transform process (transformation) is a process of transforming a pixel-domain signal into a frequency-domain signal, and includes, for example, discrete cosine transform (DCT), discrete sine transform (DST), Karhunen Loeve transform (KLT), an integer transform based on any one of such transforms, or the like.

In the present embodiment, the transformer 121 performs the transform process of a type selected from among a plurality of types of transform processes including transform skip in which no transform is performed on the residual signal. More specifically, the transformer 121 selects a type of transform process to be applied to the residual signal, for each of horizontal and vertical directions. For example, the transformer 121 selects which transform is applied, among candidates including DCT-2, DST-7, DCT-8, and other transforms (including integer transforms based on such transforms). The transformer 121 outputs transform type information indicating the selected type of transform process to the entropy encoder 130 and the filter controller 161.

The transformer 121 can select transform skip. For example, the transformer 121 selects transform skip for a residual signal including a sharp edge or a residual signal having high energy only in a local area. When transform skip is selected, the transformer 121 outputs, as transform coefficients, the residual signal adjusted through a scaling process or the like, without applying a transform such as DCT or DST. The transformer 121 may be able to apply transform skip to only one of the horizontal and vertical directions, or may be able to apply transform skip to both directions. A following description is given mainly of a case in which transform skip is applied to both the horizontal and vertical directions.

Note that the transformer 121 may select a type of transform process, for example, by performing such optimization that minimizes a linear combination of an amount of information generated in each encoding-target block and a signal distortion (that is, RD optimization), or may select a type of transform process based on a block size or a shape after division of an encoding-target block, or on a type of prediction process.

The quantizer 122 quantizes the transform coefficients outputted from the transformer 121 by using a quantization parameter (Qp) and a quantization matrix, and outputs the quantized transform coefficients to the entropy encoder 130 and the inverse quantizer/inverse transformer 140. The quantization parameter (Qp) is a parameter that is applied in common to each transform coefficient in a block, and is a parameter that determines quantization granularity. The quantization matrix is a matrix that has, as elements, quantization values used when each transform coefficient is quantized.

The entropy encoder 130 performs entropy encoding on the transform coefficients outputted from the quantizer 122, generates an encoded stream (bit stream) by performing data compression, and outputs the encoded stream to an outside of the encoding device 1. For the entropy encoding, Huffman coding, CABAC (Context-based Adaptive Binary Arithmetic Coding), or the like can be used.

The entropy encoder 130 acquires information on the size, the shape and the like of each encoding-target block from the block divider 100, acquires the transform type information from the transformer 121, acquires information related to prediction (for example, information on a prediction mode and a motion vector) from the predictor 180, and performs encoding also on the information.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the transform coefficients outputted from the quantizer 122 by using the quantization parameter (Qp) and the quantization matrix to restore the transform coefficients, and outputs the restored transform coefficients to the inverse transformer 142.

The inverse transformer 142 performs the inverse transform process corresponding to the transform process performed by the transformer 121. For example, when the transformer 121 performs DCT, the inverse transformer 142 performs inverse DCT. The inverse transformer 142 restores the residual signal by performing the inverse transform process on the transform coefficients outputted from the inverse quantizer 141, and outputs a restoration residual signal that is the restored residual signal to the combiner 150. However, when the transformer 121 applies transform skip, the inverse transformer 142 performs an inverse process corresponding to coefficient adjustment performed by the transformer 121, without performing the inverse transform process.

The combiner 150 combines the restoration residual signal outputted from the inverse transformer 142 with a prediction block outputted from the predictor 180, on a pixel-by-pixel basis. The combiner 150 reconstructs (decodes) an encoding-target block by adding individual pixel values of the restoration residual signal to individual pixel values of the prediction block, and outputs a decoded image (reconstructed block) on each of reconstructed blocks to the deblocking filter 160.

The deblocking filter 160 performs a deblocking filter process that is a filter process for the boundary between two blocks including a reconstructed block and a block adjacent to the reconstructed block (hereinafter, referred to as "filtering-target block pair"), and outputs the reconstructed block after the deblocking filter process to the memory 170. The deblocking filter process is a process for mitigating signal deterioration caused by the block-based processes, and is a filter process of smoothing a signal gap at the boundary of a filtering-target block pair. The deblocking filter 160 is configured, in general, as a low-pass filter that makes signal changes more gradual.

The filter controller 161 controls the deblocking filter 160. More specifically, the filter controller 161 controls whether or not the deblocking filter process is performed on a filtering-target block pair, and filter strength (BS: Boundary Strength) of the deblocking filter 160. The filter strength BS refers to a parameter specifying to what extent correction of pixels is allowed in the deblocking filter process. Note that control of whether or not the deblocking filter process is performed can be regarded as control of whether the filter strength BS is set to one or more, or to zero.

Specifically, the filter controller 161 controls the deblocking filter 160, based on variations of pixel values in an area near the boundary of the filtering-target block pair, the prediction mode, the quantization parameter, and values of motion vectors used in motion-compensated prediction (inter prediction). In the present embodiment, the filter controller 161 controls the deblocking filter 160, further based on whether or not the type of transform process applied to the filtering-target block pair is transform skip.

Figure 2:
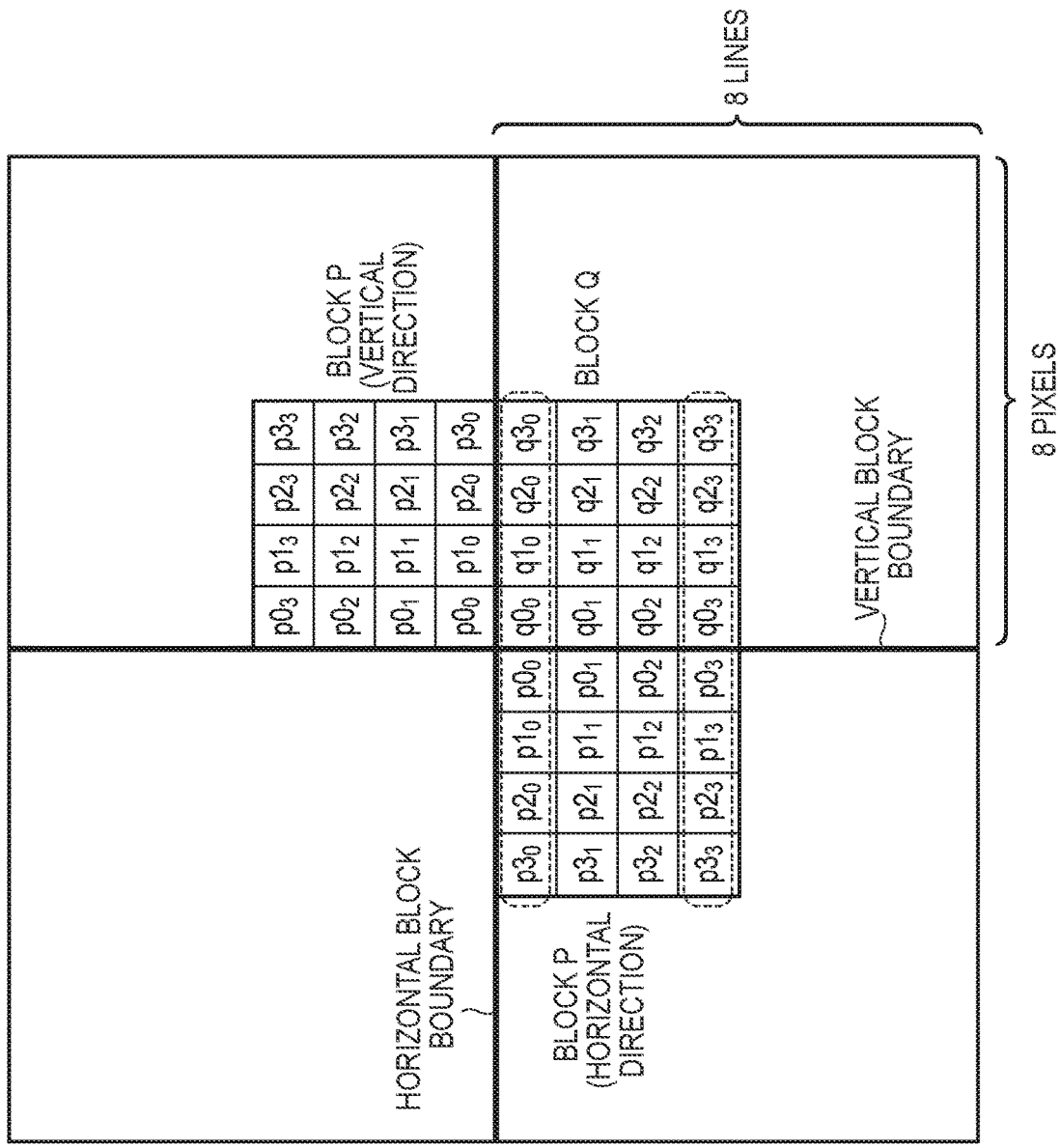
FIG. 2 is a diagram illustrating an example of operation of a deblocking filter according to the embodiment.

FIG. 2 is a diagram illustrating an example of operation of the deblocking filter 160 according to the present embodiment. In FIG. 2, a block Q is a reconstructed block corresponding to an encoding-target block, and a block P is a reconstructed block adjacent to the block Q.

In the example illustrated in FIG. 2, the block size based on which the deblocking filter 160 performs the deblocking filter process is 8×8 pixels. The filter controller 161 obtains a filter strength BS, for example, based on Table 1 below. In the present embodiment, it is assumed that the value of the filter strength BS is any one of 0, 1, 2.

TABLE 1

| BS value | Condition of determining BS value |
|---|---|
| 2 | Intra prediction is applied to at least one of two blocks |
| 1 | Difference between motion vectors of two blocks is equal to or larger than threshold value |
| 1 | At least one of two blocks includes non-zero coefficient, and the block including the non-zero coefficient is not transform skip block |
| 1 | Numbers of motion vectors of two blocks, or reference images thereof, are different |
| 0 | Other than the above |

As illustrated in FIG. 2 and Table 1, the filter controller 161 sets the value of BS to 2 when intra prediction is applied to at least one of the blocks P and Q.

The filter controller 161 sets the value of BS to 1 when motion-compensated prediction (inter prediction) is applied to both of the blocks P and Q, and when at least one condition of the following (A), (B), (C) is satisfied, and otherwise sets the value of BS to 0.

(A) The absolute value of a difference between motion vectors of the blocks P and Q is equal to or larger than a threshold value (for example, one pixel).

(B) At least one of the blocks P and Q includes a significant transform coefficient (that is, a non-zero coefficient), and the block including the non-zero coefficient is not a transform skip block.

(C) The numbers of motion vectors of the blocks P and Q, or reference images thereof, are different.

When the value of the filter strength BS is 0, the filter controller 161 controls the deblocking filter 160 such that the deblocking filter process is not performed. Hereinafter, a description is given, taking the boundary between vertical blocks illustrated in FIG. 2 as an example.

When the value of the filter strength BS is 1 or 2, the filter controller 161 may control the deblocking filter 160 such that the deblocking filter process is performed only when a following expression (1) is satisfied.

[Expression 1]

$$|p2_0-2p1_0+p0_0|+|p2_3-2p1_3+p0_3|+|q2_0-2q1_0+q0_0|+|q2_3-2q1_3+q0_3|<\beta \quad (1)$$

Note that when the deblocking filter process is performed, the filter controller 161 may apply a stronger filter when all of following conditional expressions (2) to (7) are satisfied, and otherwise apply a weaker filter.

[Expression2]

$$2(|p2_0-2p1_0+p0_0|+|q2_0-2q1_0+q0_0|)<\beta/4 \quad (2)$$

$$2(|p2_3-2p1_3+p0_3|+|q2_3-2q1_3+q0_3|)<\beta/4 \quad (3)$$

$$|p3_0-p0_0|+|q0_0-q3_0|<\beta/8 \quad (4)$$

$$|p3_3-p0_3|+|q0_3-q3_3|<\beta/8 \quad (5)$$

$$|p0_0-q0_0|<(5T_C+1)/2 \quad (6)$$

$$|p0_3-q0_3|<(5t_C+1)/2 \quad (7)$$

However, the threshold value $\beta$ and the value $t_C$ change according to an average value $Q_{av}$ of the quantization parameter between the adjacent blocks P and Q.

The memory 170 accumulates reconstructed blocks outputted from the deblocking filter 160 as decoded images in units of frames. The memory 170 outputs the stored decoded images to the predictor 180.

The predictor 180 generates a prediction block corresponding to an encoding-target block by performing a prediction process in units of the block, and outputs the generated prediction block to the subtractor 110 and the combiner 150. The predictor 180 includes an inter predictor 181, an intra predictor 182 and a switcher 183.

The inter predictor 181 calculates a motion vector through a scheme such as block matching by using, for a reference image, a decoded image stored in the memory 170, generates an inter prediction block by predicting an encoding-target block, and outputs the generated inter prediction block to the switcher 183. The inter predictor 181 selects an optimal inter prediction method, from inter prediction using a plurality of reference images (typically, bi-prediction) and inter prediction using one reference image (uni-directional prediction), and performs inter prediction by using the selected inter prediction method. The inter predictor 181 outputs information related to inter prediction (the motion vector and the like) to the entropy encoder 130 and the filter controller 161.

The intra predictor 182 selects an optimal intra prediction mode to be applied to an encoding-target block from among a plurality of intra prediction modes, and predicts the encoding-target block by using the selected intra prediction mode. The intra predictor 182 generates an intra prediction block by referencing decoded pixel values adjacent to the encoding-target block of a decoded image stored in the memory 170, and outputs the generated intra prediction block to the switcher 183. The intra predictor 182 outputs information related to the selected intra prediction mode to the entropy encoder 130 and the filter controller 161.

The switch 183 switches the prediction block between the inter prediction block outputted from the inter predictor 181 and the intra prediction block outputted from the intra predictor 182 and outputs one of the prediction blocks to the subtractor 110 and the combiner 150.

As described above, the encoding device 1 according to the present embodiment includes: the transformer/quantizer 120 configured to perform a transform process and a quantization process on a residual signal that represents a difference between an encoding-target block and a prediction block obtained by predicting the encoding-target block; the inverse quantizer/inverse transformer 140 configured to restore the residual signal by performing an inverse quantization process and an inverse transform process on transform coefficients obtained by the transformer/quantizer 120; the combiner 150 configured to reconstruct the encoding-target block by combining the restored residual signal and the prediction block; and the deblocking filter 160 configured to perform a filter process on a boundary between two blocks (filtering-target block pair) including the reconstructed block and a block adjacent to the reconstructed block.

Next, details of operation of the filter controller 161 according to the present embodiment are described.

As mentioned above, when intra prediction is applied to at least one block of a filtering-target block pair including a reconstructed block corresponding to an encoding-target block and a block adjacent to the reconstructed block, the filter controller 161 applies the deblocking filter to the boundary of the filtering-target block pair. This is because discontinuity is likely to occur at a block boundary when intra prediction is applied.

Moreover, the filter controller 161 applies the deblocking filter to the boundary of the filtering-target block pair when inter prediction is applied to each block of the filtering-target block pair, and when a difference between motion vectors applied to the filtering-target block pair is equal to or larger than a predetermined threshold value. This is because discontinuity is likely to occur at a block boundary when motion vectors are different.

Further, the filter controller 161 applies the deblocking filter to the boundary of the filtering-target block pair, even if the difference between the motion vectors is smaller than the threshold value, when a non-zero coefficient exists in at least one block of the filtering-target block pair. This is because, since energy of the residual signal is distributed all over the block as a result of inverse transform of the non-zero coefficient, discontinuity is likely to occur at the boundary of the two blocks even if the motion vectors are identical.

However, even if a non-zero coefficient exists in at least one block of the filtering-target block pair, the non-zero coefficient is outputted as it is after subjected to adjustment such as scaling when transform skip is applied to the block in which the non-zero coefficient exists. Accordingly, energy is not distributed all over the block, so that discontinuity between the blocks does not occur.

Accordingly, in the present embodiment, when a non-zero coefficient exists in at least one block of a filtering-target block pair, and when transform skip is applied to the block, of the filtering-target block pair, in which the non-zero coefficient exists, the filter controller 161 controls the deblocking filter 160 such that the deblocking filter process is not applied. Thus, the deblocking filter process is eliminated when discontinuity between blocks does not occur, whereby it is possible to prevent a blur from appearing in a decoded image, and to prevent image quality from being degraded and encoding efficiency from being lowered.

FIG. 3A to 3D are diagrams illustrating a specific example of the operation of the filter controller 161 according to the present embodiment. In FIGS. 3A to 3D, blocks P and Q constitute a filtering-target block pair, and it is assumed that inter prediction is applied to each of the blocks. Moreover, an arrow in each block in FIG. 3A to 3D represents a motion vector, and it is assumed that the motion vector of the block P and the motion vector of the block Q are identical.

Figure 3A:
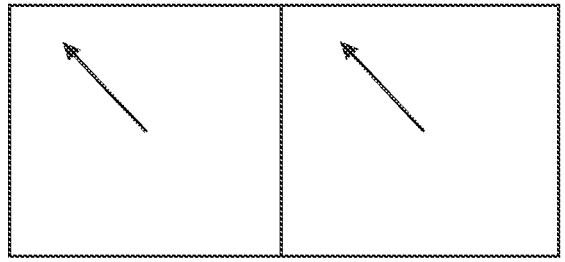
FIG. 3A is a diagram illustrating a specific example of operation of a filter controller according to the embodiment.

As illustrated in FIG. 3A, when no non-zero coefficient exists in either block of the filtering-target block pair, the filter controller 161 does not apply the deblocking filter process to the boundary of the filtering-target block pair.

Figure 3B:
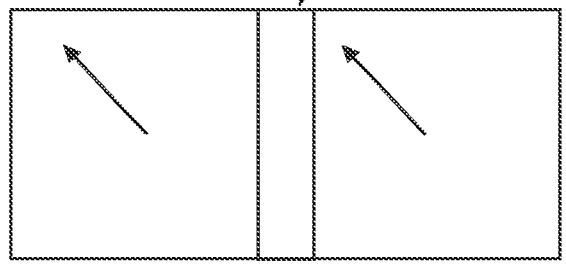
FIG. 3B is a diagram illustrating a specific example of operation of a filter controller according to the embodiment.

As illustrated in FIG. 3B, when a non-zero coefficient exists in at least one block of the filtering-target block pair, and when transform skip is not applied to the block in which the non-zero coefficient exists, the filter controller 161 applies the deblocking filter process to the boundary of the filtering-target block pair. More specifically, since a non-zero coefficient exists in the block P, and transform skip is not applied to the block P, the filter controller 161 applies the deblocking filter process to the boundary of the filtering-target block pair.

Figure 3C:
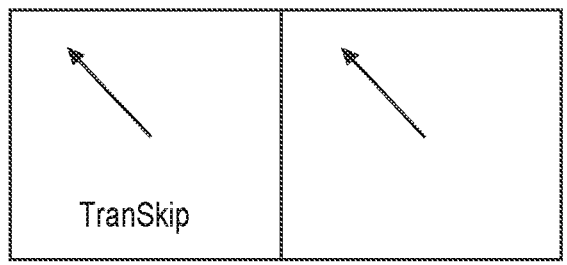
FIG. 3C is a diagram illustrating a specific example of operation of a filter controller according to the embodiment.

As illustrated in FIG. 3C, when a non-zero coefficient exists in at least one block of the filtering-target block pair, and when transform skip is applied to the block in which the non-zero coefficient exists, the filter controller 161 does not apply the deblocking filter process to the boundary of the filtering-target block pair. More specifically, since a non-zero coefficient exists in the block P, and transform skip (TranSkip) is not applied to the block P, the filter controller 161 applies the deblocking filter process to the boundary of the filtering-target block pair.

Figure 3D:
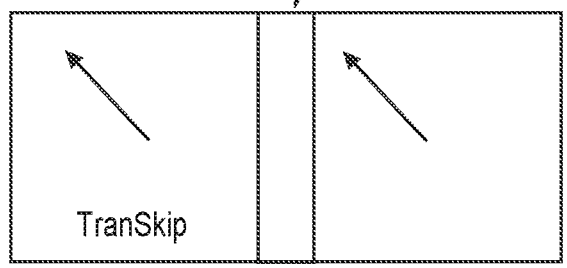
FIG. 3D is a diagram illustrating a specific example of operation of a filter controller according to the embodiment.

As illustrated in FIG. 3D, when a non-zero coefficient exists in both blocks of the filtering-target block pair, and when transform skip is not applied to the blocks in which the non-zero coefficients exist, the filter controller 161 applies the deblocking filter process to the boundary of the filtering-target block pair. More specifically, since a non-zero coefficient exists in both of the blocks P and Q, transform skip (TranSkip) is applied to the block P, and transform skip (TranSkip) is not applied to the block Q, the filter controller 161 applies the deblocking filter process to the boundary of the filtering-target block pair.

<Configuration of Decoding Device>

Next, a configuration of the decoding device according to the present embodiment is described, focusing mainly on differences from the configuration of the encoding device described above. FIG. 4 is a diagram illustrating the configuration of the decoding device 2 according to the present embodiment. The decoding device 2 is a device that decodes a decoding-target block from an encoded stream.

As illustrated in FIG. 4, the decoding device 2 includes an entropy decoder 200, an inverse quantizer/inverse transformer 210, a combiner 220, a deblocking filter 230, a filter controller 231, a memory 240, and a predictor 250.

The entropy decoder 200 decodes various signaling information by decoding an encoded stream generated by the encoding device 1. More specifically, the entropy decoder 200 acquires information related to a transform process applied to a decoding-target block (for example, transform type information), and outputs the acquired information to an inverse transformer 212 and the filter controller 231. Moreover, the entropy decoder 200 acquires information related to prediction applied to the decoding-target block (for example, prediction type information, motion vector information), and outputs the acquired information to the predictor 250 and the filter controller 231.

The entropy decoder 200 decodes the encoded stream, acquires quantized transform coefficients, and outputs the acquired transform coefficients to the inverse quantizer/inverse transformer 210 (inverse quantizer 211).

The inverse quantizer/inverse transformer 210 that executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse-quantizes the quantized transform coefficients outputted from the entropy decoder 200 by using the quantization parameter (Qp) and the quantization matrix to restore transform coefficients in the decoding-target block, and outputs the restored transform coefficients to the inverse transformer 212.

The inverse transformer 212 performs the inverse transform process corresponding to the transform process performed by the transformer 121 of the encoding device 1. The inverse transformer 212 restores a residual signal by performing the inverse transform process on the transform coefficients outputted from the inverse quantizer 211, and outputs the restored residual signal (restoration residual signal) to the combiner 220. In the present embodiment, the inverse transformer 212 performs the inverse transform process of a type selected, based on the transform type information outputted from the entropy decoder 200, from among a plurality of types of inverse transform processes including transform skip in which no inverse transform is performed. In a case of transform skip, the inverse transformer 212 performs an inverse process corresponding to coefficient adjustment performed by the transformer 121 of the encoding device 1, without performing the inverse transform process.

The combiner 220 reconstructs (decodes) the decoding-target block by combining the residual signal outputted from the inverse transformer 212 and a prediction block outputted from the predictor 250 on a pixel-by-pixel basis, and outputs a reconstructed block to the deblocking filter 230.

The deblocking filter 230 performs operation similar to the operation of the deblocking filter 160 of the encoding device 1. The deblocking filter 230 performs a deblocking filter process on the boundary of a filtering-target block pair including the reconstructed block outputted from the combiner 220 and a block adjacent to the reconstructed block, and outputs the reconstructed block after the deblocking filter process to the memory 240.

The filter controller 231 performs operation similar to the operation of the filter controller 161 of the encoding device 1, based on the information outputted from the entropy decoder 200. The filter controller 231 selects a filter strength BS, for example, through the method illustrated in Table 1, and controls the deblocking filter 230, according to the selected filter strength BS.

The memory 240 stores the reconstructed blocks outputted from the deblocking filter 230 as decoded images in units of frames. The memory 240 outputs the decoded images in units of frames to an outside of the decoding device 2.

The predictor 250 performs prediction in units of blocks. The predictor 250 includes an inter predictor 251, an intra predictor 252 and a switch 253.

The inter predictor 251 predicts a decoding-target block through inter prediction by using, for a reference image, a decoded image stored in the memory 240. The inter predictor 251 generates an inter prediction block by performing inter prediction, by using the motion vector information outputted from the entropy decoder 200, and outputs the generated inter prediction block to the switcher 253.

The intra predictor 252 references reference pixels adjacent to a decoding-target block of a decoded image stored in the memory 240, and predicts the decoding-target block through intra prediction, based on the information outputted from the entropy decoder 200. The intra predictor 252 generates an intra-prediction block, and outputs the generated intra prediction block to the switcher 253.

The switch 253 switches the prediction block between the inter prediction block outputted from the inter predictor 251 and the intra prediction block outputted from the intra predictor 252 and outputs one of the prediction blocks to the combiner 220.

As described above, the decoding device 2 according to the present embodiment includes: the entropy decoder 200 configured to output quantized transform coefficients corresponding to a decoding-target block by decoding an encoded stream; the inverse quantizer/inverse transformer 210 configured to restore a residual signal by performing an inverse quantization process and an inverse transform process on the transform coefficients outputted by the entropy decoder 200; the combiner 220 configured to reconstruct a block by combining the restored residual signal and a prediction block obtained by predicting the decoding-target block; the deblocking filter 230 configured to perform a filter process on a boundary of a filtering-target block pair including the reconstructed block and a block adjacent to the reconstructed block; and the filter controller 231 configured to control the deblocking filter 230, based on a type of the inverse transform process applied with respect to the filtering-target block pair.

Here, the filter controller 231 performs operation as illustrated in FIG. 3A to 3D. Specifically, when a non-zero coefficient exists in at least one block of a filtering-target block pair, and when transform skip is not applied to the block, of the filtering-target block pair, in which the non-zero coefficient exists, the filter controller 231 controls the deblocking filter 230 such that the deblocking filter process is performed.

When a non-zero coefficient exists in at least one block of the filtering-target block pair, and when transform skip is applied to the block, of the filtering-target block pair, in which the non-zero coefficient exists, the filter controller 231 controls the deblocking filter 230 such that the deblocking filter process is not performed. Thus, the deblocking filter process is eliminated when discontinuity between blocks does not occur, whereby it is possible to prevent a blur from appearing in a decoded image, and to prevent image quality from being degraded and encoding efficiency from being lowered.

<Example of Operation of Filter Controller>

Figure 5:
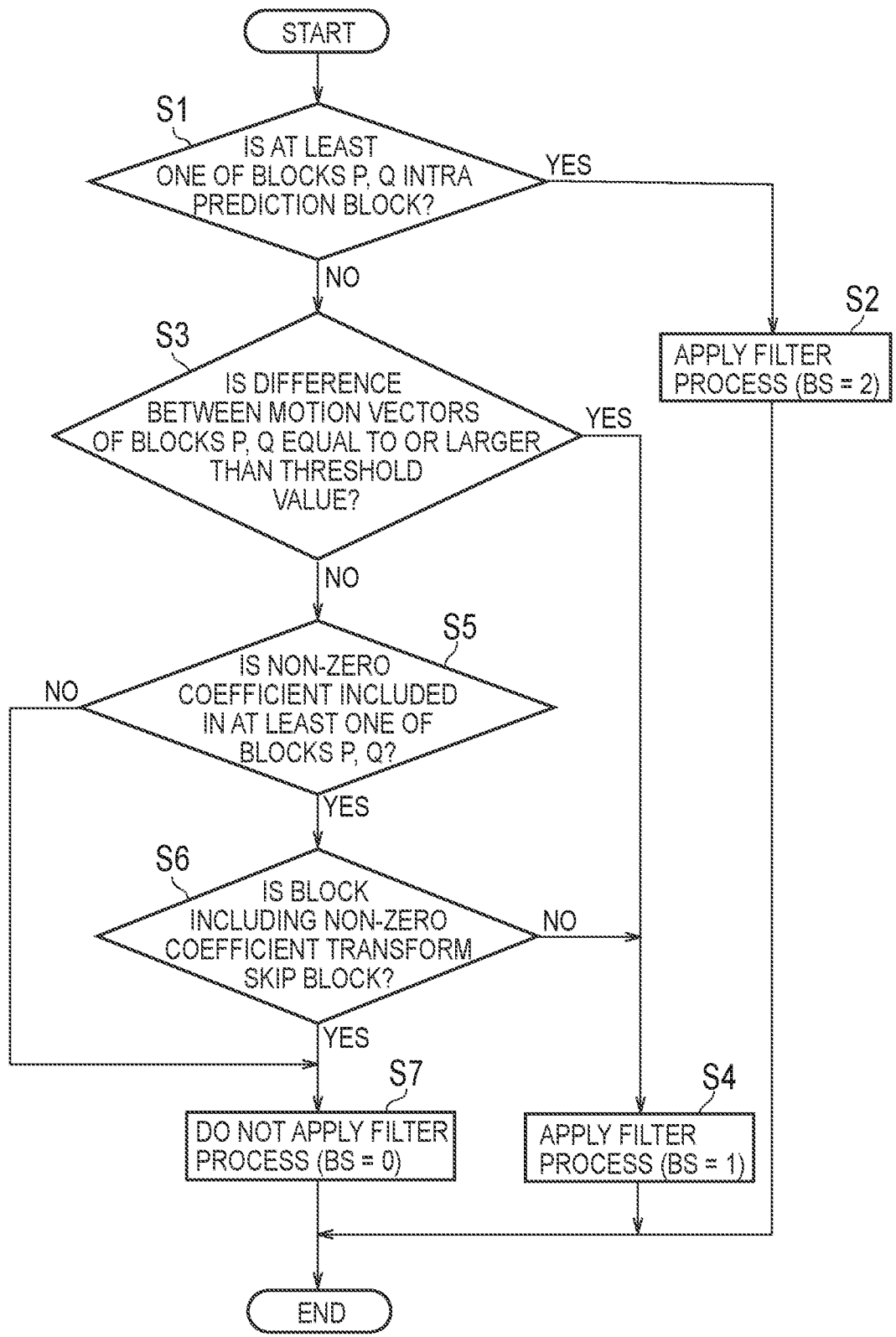
FIG. 5 is a diagram illustrating an example of operation of the filter controller according to the embodiment.

Next, an example of the operation of the filter controllers 161 and 231 according to the present embodiment is described. Since the filter controllers 161 and 231 perform the same operation, a description is given by taking the filter controller 231 as an example. FIG. 5 is a diagram illustrating the example of the operation of the filter controller 231 according to the present embodiment.

As illustrated in FIG. 5, in step S1, the filter controller 231 determines whether or not intra prediction is applied to at least one block of a filtering-target block pair including blocks P and Q. When intra prediction is applied to at least one block of the filtering-target block pair (step S1: YES), in step S2, the filter controller 231 controls the deblocking filter 230 such that the deblocking filter process is performed. More specifically, the filter controller 231 selects a filter strength BS=2.

When intra prediction is applied to neither of the filtering-target block pair (step S1: NO), in step S3, the filter controller 231 determines whether or not a difference between motion vectors of the target block pair is equal to or larger than a threshold value. When the difference between the motion vectors of the target block pair is equal to or larger than the threshold value (step S3: YES), in step S4, the filter controller 231 controls the deblocking filter 230 such that the deblocking filter process is performed. More specifically, the filter controller 231 selects a filter strength BS=1.

When the difference between the motion vectors of the target block pair is not equal to or larger than the threshold value (step S3: NO), in step S5, the filter controller 231 determines whether or not a non-zero coefficient is included in at least one block of the target block pair. When a non-zero coefficient is not included in at least one block of the target block pair (step S5: NO), in step S7, the filter controller 231 controls the deblocking filter 230 such that the deblocking filter process is not performed. More specifically, the filter controller 231 selects a filter strength BS=0.

When a non-zero coefficient is included in at least one block of the target block pair (step S5: YES), in step S6, the filter controller 231 determines whether or not transform skip is applied to the block in which the non-zero coefficient is included. When transform skip is not applied to the block in which the non-zero coefficient is included (step S6: NO), in step S4, the filter controller 231 controls the deblocking filter 230 such that the deblocking filter process is performed. More specifically, the filter controller 231 selects a filter strength BS=1. When transform skip is applied to the block in which the non-zero coefficient is included (step S6: YES), in step S7, the filter controller 231 controls the deblocking filter 230 such that the deblocking filter process is not performed. More specifically, the filter controller 231 selects a filter strength BS=0.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that encodes a block obtained by dividing an image, the encoding device comprising:
   a transformer/quantizer configured to perform a transform process and a quantization process on a residual signal that represents a difference between the block and a prediction block obtained by predicting the block;
   an inverse quantizer/inverse transformer configured to restore the residual signal by performing an inverse quantization process and an inverse transform process on transform coefficients obtained by the transformer/quantizer;
   a combiner configured to reconstruct the block by combining the restored residual signal and the prediction block;
   a deblocking filter configured to perform a filter process on a boundary between two blocks including the reconstructed block and a block adjacent to the reconstructed block; and a filter controller configured to control the deblocking filter, based on information about the transform process applied with respect to the two blocks, wherein the filter controller is configured to control the deblocking filter such that the filter process is not performed, when the information indicates that transform skip is applied to the two blocks, the filter controller is configured to:

determine, for each of the two blocks, whether or not a non-zero coefficient exists among the transform coefficients;

control the deblocking filter such that the filter process is performed when a non-zero coefficient exists in at least one of the two blocks and the information indicates that the transform skip is not applied to the block in which the non-zero coefficient exists, of the two blocks; and control the deblocking filter such that the filter process is not performed only when the information indicates that the transform skip is applied to the two blocks, provided that non-zero coefficients exist in the two blocks.

2. A decoding device that decodes a block obtained by dividing an image, the decoding device comprising:

an entropy decoder configured to output quantized transform coefficients corresponding to the block by decoding an encoded stream;

an inverse quantizer/inverse transformer configured to restore a residual signal by performing an inverse quantization process and an inverse transform process on the transform coefficients outputted by the entropy decoder;

a combiner configured to reconstruct the block by combining the restored residual signal and a prediction block obtained by predicting the block;

a deblocking filter configured to perform a filter process on a boundary between two blocks including the reconstructed block and a block adjacent to the reconstructed block; and a filter controller configured to control the deblocking filter, based on information about transform process applied with respect to the two blocks, wherein the filter controller is configured to control the deblocking filter such that the filter process is not performed, when the information indicates that transform skip is applied to the two blocks, the filter controller is configured to:

determine, for each of the two blocks, whether or not a non-zero coefficient exists among the transform coefficients;

control the deblocking filter such that the filter process is performed when a non-zero coefficient exists in at least one of the two blocks and the information indicates that the transform skip is not applied to the block in which the non-zero coefficient exists, of the two blocks; and control the deblocking filter such that the filter process is not performed only when the transform skip is applied to the two blocks, provided that non-zero coefficients exist in the two blocks.

3. An encoding method for encoding a block obtained by dividing an image, the encoding method comprising:

performing a transform process and a quantization process on a residual signal that represents a difference between the block and a prediction block obtained by predicting the block;

restoring the residual signal by performing an inverse quantization process and an inverse transform process on transform coefficients obtained by the transform process and quantization process;

reconstructing the block by combining the restored residual signal and the prediction block;

performing a filter process on a boundary between two blocks including the reconstructed block and a block adjacent to the reconstructed block; and controlling the filter process, based on information about the transform process applied with respect to the two blocks, wherein the filter process is not performed when the information indicates that transform skip is applied to the two blocks, wherein the controlling the filter process comprises:

determining, for each of the two blocks, whether or not a non-zero coefficient exists among the transform coefficients;

controlling the filter process such that the filter process is performed when a non-zero coefficient exists in at least one of the two blocks and the information indicates that the transform skip is not applied to the block in which the non-zero coefficient exists, of the two blocks; and controlling the filter process such that the filter process is not performed only when the information indicates that the transform skip is applied to the two blocks, provided that non-zero coefficients exist in the two blocks.

4. A decoding method for decoding a block obtained by dividing an image, the decoding method comprising:

outputting quantized transform coefficients corresponding to the block by decoding an encoded stream;

restoring a residual signal by performing an inverse quantization process and an inverse transform process on the transform coefficients;

reconstructing the block by combining the restored residual signal and a prediction block obtained by predicting the block;

performing a filter process on a boundary between two blocks including the reconstructed block and a block adjacent to the reconstructed block; and controlling the filter process, based on information about transform process applied with respect to the two blocks, wherein the filter process is not performed when the information indicates that transform skip is applied to the two blocks, wherein the controlling the filter process comprises:

determining, for each of the two blocks, whether or not a non-zero coefficient exists among the transform coefficients;

controlling the filter process such that the filter process is performed when a non-zero coefficient exists in at least one of the two blocks and the information indicates that the transform skip is not applied to the block in which the non-zero coefficient exists, of the two blocks; and controlling the filter process such that the filter process is not performed only when the transform skip is applied to the two blocks, provided that non-zero coefficients exist in the two blocks.

* * * * *